W. L. HERRON.
BLOWPIPE APPARATUS.
APPLICATION FILED DEC. 21, 1917.
1,358,637.
Patented Nov. 9, 1920.
2 SHEETS—SHEET 1.
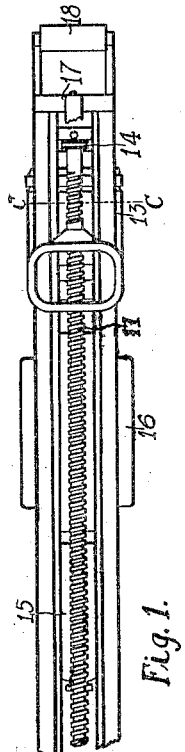
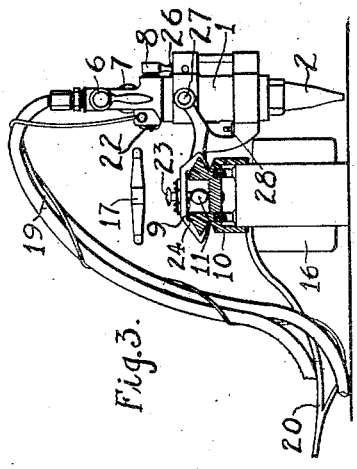
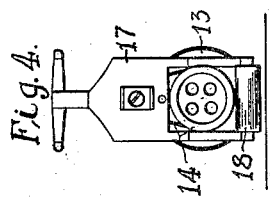
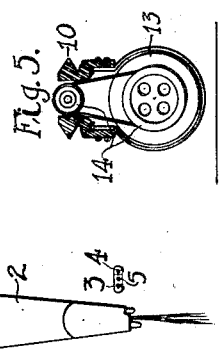
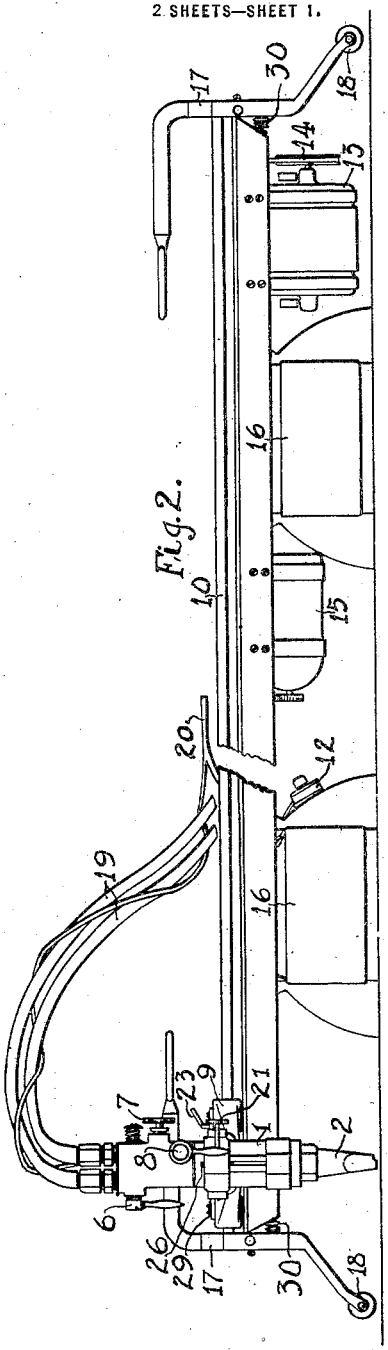
INVENTOR
William L. Herron
William F Dusenbury Jr.

W. L. HERRON.
BLOWPIPE APPARATUS.
APPLICATION FILED DEC. 21, 1917.
1,358,637.
Patented Nov. 9, 1920.
2 SHEETS—SHEET 2.
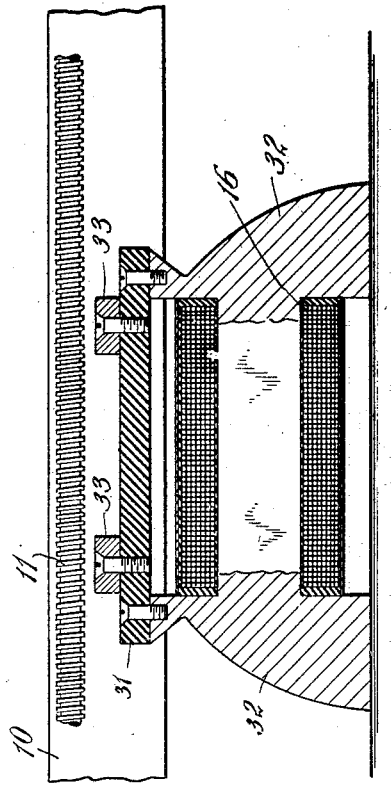
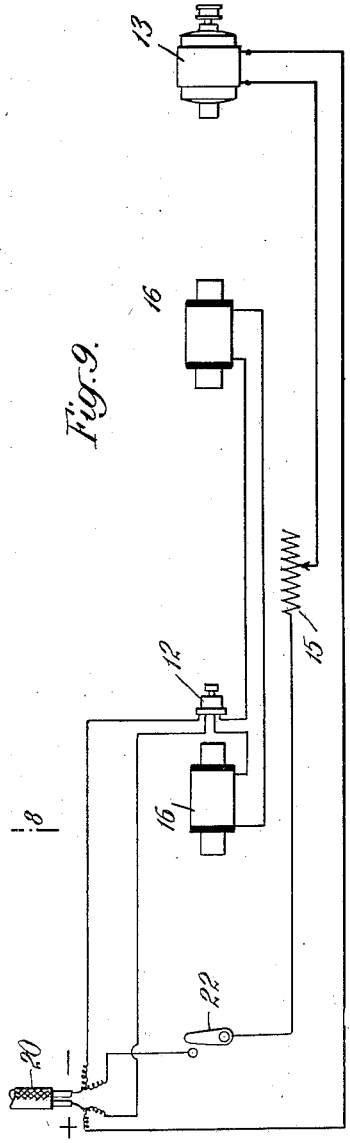
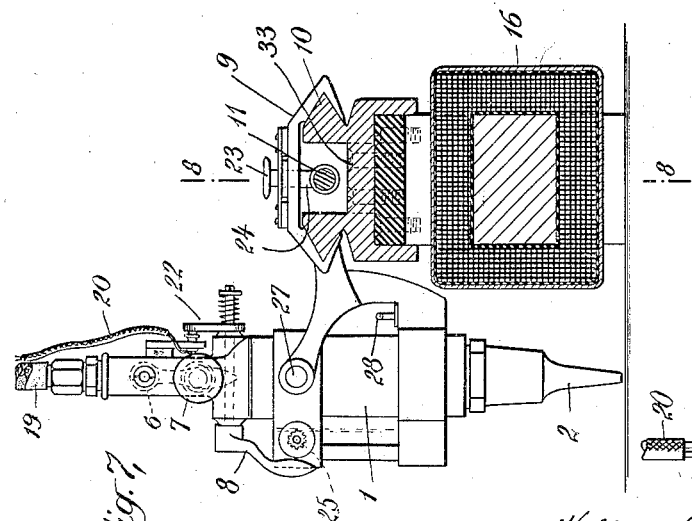
Inventor
William L. Herron
By his Attorneys
Pennie, Davis, Marvin & Edmonds

UNITED STATES PATENT OFFICE.

WILLIAM LEO HERRON, OF BROOKLYN, NEW YORK.

BLOWPIPE APPARATUS.

1,358,637.  Specification of Letters Patent.  Patented Nov. 9, 1920.

Application filed December 21, 1917. Serial No. 208,314.

*To all whom it may concern:*

Be it known that I, WILLIAM LEO HERRON, a citizen of the United States, residing at 926 Prospect Pl., Brooklyn, in the county of Kings and the State of New York, have invented a new and useful Blowpipe Apparatus, of which the following is a specification.

The present invention relates to improvements in blow pipe apparatus for cutting or softening metal by the use of a high temperature flame such as is produced, for instance, by an oxygen-acetylene or an oxygen-hydrogen jet.

The object of the invention is to provide a portable apparatus particularly adapted to cut metal plates of various thickness with the utmost accuracy and smoothness and with a finish comparable to that now produced by planing machines; but without requiring that the plates should be moved to and positioned upon the bed of a machine. The character of the improved apparatus is such that the plates may be cut or butt-finished in any position just as they come from the punching and shearing machines of the fabricating department of a shipbuilding plant, for example, by properly positioning the portable apparatus on the plate and traversing the accurately guided blow pipe lengthwise of the apparatus to make the cut.

Apparatus has heretofore been proposed having a torch mounted upon a wheeled carriage adapted to travel over the surface of the metal to be cut, the carriage being guided by a frame provided with electromagnets at its ends by which it may be held in place upon an iron or steel plate.

In accordance with the present invention, the blow pipe carriage is carried upon a lathe-like bed or guideway heavy enough to prevent vibration of the blow pipe and rigidly supported throughout its length by massive pedestals of magnetic material provided with magnetizing windings capable of holding the apparatus with the utmost security in fixed position on the plate to be cut. By virtue of this arrangement the carriage may be fitted to the guiding frame with absolute trueness and moved along the latter with the same accuracy as the tailstock of a lathe. This is important in a machine of this character because the jet of the blow pipe must be guided with the utmost accuracy in order that it may properly perform its work and produce a cut which will be so accurate and smooth that the necessity for performing further operations upon the plates, as, for instance, by planing machines, is eliminated; so that the present apparatus may be used in successful competition with the usual tool cutting and planing machines. The accuracy of the apparatus is not eliminated by the thickness of the plates which are being cut so that it may be used for cutting plates of any of the various manufactured thicknesses. Owing to the fact that the blow pipe is mounted in a manner to be entirely free from vibration, the sensitiveness of the oxygen jet which attacks the metal may be more accurately controlled, thus further enhancing the precision which may be attained in using the apparatus.

Other objects and advantages of the present invention will appear more clearly from a detailed description of a preferred embodiment thereof, as shown in the accompanying drawings, in which Figure 1 is a plan view of the entire machine; Fig. 2 is a front view of the same; Fig. 3 is a cross-section of the machine taken along the lines A—A and B—B of Fig. 1; Fig. 4 is a view of one end of the machine showing one of the combined roller supports and handles by which the machine may be lifted and also moved about on the plate to be cut; Fig. 5 is a cross-section through the machine along the lines C—C of Fig. 1, Fig. 6 is an enlarged view of the tip of the blow pipe or torch, Fig. 7 is a transverse section on an enlarged scale showing the mode of attachment of the magnets; Fig. 8 is a central longitudinal section along the line 8—8 of Fig. 7, and Fig. 9 is a diagram of the electrical connections of the apparatus.

Referring to the drawings, in which similar reference characters denote similar parts throughout the several views, there is shown at 1 a cutting blow pipe provided with a tip 2 formed with two orifices 3 and 4 through which the usual heating jets of acetylene and oxygen are supplied to produce a highly concentrated heat when ignited, and with a central orifice 5 from which a cutting jet of oxygen may be emitted to attack the metal after the latter has been heated by the flame emitted from jets 3 and 4 in the usual way. Suitable valves for controlling the mixture of oxygen and acetylene and the discharge of oxygen from the central orifice are shown at 6, 7 and 8. The acetylene and oxygen gases are supplied to the blow pipe through rubber tubing 19 connected to sources of gas supply.

The blow pipe 1 is held by the arms of a blow pipe carriage 9 mounted upon a lathe-like bed or guideway 10 and adapted to be moved at uniform speed along the latter by the action of a worm shaft 11 driven by an electric motor 13 through pulleys and a belt 14. An electric rheostat 15 connected in circuit with the motor 13 provides for regulating the speed of the latter and hence the speed of the worm shaft 11. This construction of bed or guideway and power drive is such as to eliminate all vibration of the blow pipe and all departure thereof from a perfectly true line. The bed or guideway 10 is rigidly supported throughout its length by the massive iron or steel pedestals, wound with magnetizing coils 16 to form bi-polar electromagnets, the cores of which should be laminated.

The manner in which the magnets are attached to bed 10 is shown most clearly in Figs. 7 and 8. A non-magnetic member 31 is attached to the top of the pole-pieces 32 which preferably have the shape shown. The non-magnetic members are attached to transverse supports 33 extending between the longitudinal members of the bed. There is thus formed between each magnet and the bed a non-magnetic connection which prevents leakage of the magnetic flux through the adjacent portions of the bed with consequent lessening of the strength of the magnet. It will be understood, however, that the invention is not limited to magnets having the particular shape shown and being attached to the bed in the manner described, provided they are sufficiently massive to afford a firm support for the apparatus.

Current for the motor 13 and the electromagnets 16 is supplied from a cable 20 running to any suitable source, the circuit connections being shown most clearly in Fig. 9. The conductors of the cable are branched into two pairs, one of which leads to a snap switch 12 mounted at any convenient point of the bed, or preferably on one of the magnets, and then to the windings of the magnets which are connected in series with each other. The other pair of conductors includes the motor 13, the rheostat 15 and a switch 22 mounted upon the head of the blow pipe and operatively connected to the valve 8 which controls the supply of oxygen to the jet 5, the arrangement being such that when the oxgen valve is open, the switch is closed, and when the valve is closed, the switch is open.

In order to permit the apparatus to be moved easily over the surface of the plate to be cut and to be set accurately upon the plate, handles 17 are pivotally attached to the end of the frame and are formed with downwardly extending legs, between the lower ends of which rollers 18 are mounted. Small springs 30 normally hold the rollers above the surface of the plate, but if the handles are elevated, the rollers are brought into contact with the plate and the entire apparatus may be rolled easily over the surface of the plate into any desired position. The handles likewise serve for carrying the apparatus from place to place and also act as levers by which the apparatus may be pried from a plate after the electromagnets have been deënergized, thereby overcoming the effect of the residual magnetism in their cores.

The blow pipe should be arranged so that it may be raised or lowered on its carriage 9, and for this purpose it is slidably mounted in a frame and is provided with a rack 26 engaged by a pinion 25 having an operating wheel 21. The frame is pivotally attached to the blow pipe carriage as at 27 to permit the blow pipe to be tilted for the purpose of being cleaned. A pin 28 is provided to hold the blowpipe locked in its vertical position. The blow pipe carriage is provided with a member having teeth 24 which are normally held in engagement with the worm shaft 11 by a spring 29, but may be lifted out of engagement by a thumb lever 23 to permit the blow pipe carriage to be moved independently of the worm shaft.

In the use of the machine described above, a line is first marked on the surface of the plate which is to be cut, and the guiding frame of the machine is set parallel to this line, accurate setting of the machine being facilitated by raising the handles 17 so that the weight of the apparatus may be carried on the rollers 18. When the machine is properly set, the handles are depressed to lower the machine into place on the plate. Switch 12 is then closed to allow current to pass through the coils of the electromagnets 16 to energize them. These electromagnets will then hold the entire machine securely on the surface to be cut, thereby providing a rigid support and guideway free from vibration and displacement during movement of the blow pipe carriage along the same.

By means of the rack and pinion 26 and 25, the blow pipe may be adjusted so that its tip is at the proper distance from the surface of the plate, this distance being in general about one-eighth of an inch. Upon ignition, the heat generated by these gases, amounting to some five thousand degrees Fahrenheit, heats the steel to a red heat. When the steel is in this condition, the valve 8 controlling the emission of oxygen from the central orifice 5 of the tip 2 is opened. The oxygen then attacks the steel, forcing its way through the metal by its burning action and high pressure. Manipulation of the valve 8 simultaneously closes the switch 22, thus allowing current to flow through the motor 13 which then moves the blow pipe carriage 9 along the bed or guideway 10. The blow pipe will thus be moved at uniform speed, and on account of the mechanical construction of the apparatus, there will be entire freedom from vibration so that the cut produced by the flame will be straight and smooth. The cutting action will continue until the blow pipe carriage reaches the other end of the guideway, or until the desired length of cut has been made, whereupon the valve 8 will be closed to shut off the supply of oxygen at the orifice 5 and stop the cutting action. Simultaneously the switch 22 governing the motor is opened, thereby discontinuing the flow of current through the latter and allowing the blow pipe carriage to come to rest. During the cutting operation, the forward travel of the blow pipe may be controlled by the rheostat 15 in the motor circuit, this speed being adjusted for the thickness of the metal that is to be cut.

The blow pipe carriage 9 may be conveniently returned to its original starting point in readiness for another cutting operation by pressing the thumb lever 23 which raises the intermeshing teeth 24 from the worm shaft 11, thus allowing the blow pipe carriage to be pushed along the guideway to its initial position. As soon as one cut has been taken, the switch 12 is opened to deënergize the electromagnets 16 so that the machines may be lifted upon the rollers 18 and moved into a new position on the plate for the next cutting operation.

It will be understood that various changes may be made in the details of construction of the apparatus without departing from the principle of the invention, and that whenever I use the term "blow pipe apparatus" in the appended claims, I intend it to include any form of apparatus for producing by means of a jet of burning gases a high temperature which may be used for cutting, welding or other work.

I am aware that previous to my invention oxygen-acetylene-steel cutting machines have been made with blowpipe apparatus in conjunction with an electric motor driven means of propulsion. I do not therefore claim such a combination broadly; but

I claim:

1. In a blow pipe apparatus for the purpose described, the combination of a guiding bed constituting the main frame of the apparatus, electromagnets associated with the bed for securing it to the surface of magnetizable metal to be cut, a torch carriage supported solely upon the bed, and means for propelling the carriage along the bed.

2. In a blow pipe apparatus for the purpose described, the combination of a guiding bed constituting the main frame of the apparatus and provided with guide-ways, electromagnets associated with the bed for securing it to the surface of magnetizable metal to be cut, a torch carriage supported entirely upon the bed in closely fitting sliding engagement with the guide-ways, a worm shaft fitted between the guide-ways and operatively connected to the torch carriage, and means for rotating the worm shaft to propel the carriage along the guiding bed.

3. The combination of a self-contained, portable mechanical blowpipe apparatus for the purpose described, of a guiding bed mounted on electromagnets as a means for securing it to the surface of magnetizable metal to be cut and having guiding surfaces, a worm shaft fitted between the said guiding surfaces, a torch carriage carried upon said guiding bed and shaped to engage the guiding surfaces, means for rotating said worm shaft to propel the carriage along the guiding bed, and a disengageable driving connection between the carriage and the worm shaft whereby the carriage may be freed from the worm shaft and shifted from place to place on the guiding bed.

4. In a blowpipe apparatus for the purpose described, the combination of a pair of electromagnets, a guiding frame mounted thereon, a torch carriage carried upon said frame, means for propelling said carriage along the frame, and a pair of combined handles and roller supports pivoted to the machine so that when the handles are lifted the rollers will be brought into contact with the surface on which the machine rests.

5. In a blowpipe apparatus for the purpose described, the combination of a pair of electromagnets, a guiding frame mounted thereon, a torch carriage carried upon said frame, means for propelling said carriage along the frame, a pair of combined handles and roller supports pivoted to the machine so that when the handles are lifted the rollers will be brought into contact with the surface on which the machine rests, and springs fitted between the bed and the handles to maintain the handles depressed and the roller supports out of contact with the surface on which the apparatus rests.

6. In a blow pipe apparatus for the purpose described, the combination of a guiding bed constituting the main frame of the apparatus and mounted on electromagnets as a means for securing it to the surface of magnetizable metal to be cut, a worm shaft on said guiding bed for propelling a torch carriage, and a torch carriage carried upon said guiding bed and carrying an adjustable blow pipe.

7. In a blow pipe apparatus for the purpose described, the combination of a guiding bed constituting the main frame of the apparatus, electromagnets associated with the bed for securing it to the surface of magnetizable metal to be cut, a blow pipe carriage supported solely upon the bed, means for propelling the carriage along the bed, and handles pivotally attached to the frame and adapted to be brought into engagement with the surface upon which the apparatus is placed to lift the same therefrom.

8. In a portable blow pipe apparatus for the purpose described, the combination of a main guiding bed, electromagnets attached to the bed for securing it to a steel or iron surface, a worm shaft fitted to said bed, an electric motor mounted on the under side of said guiding bed, belt and pulley connections between said motor and said worm shaft, and a torch carriage slidably mounted on the bed and adapted to be adjusted in position thereon by said worm shaft, said torch carriage being formed with arms for holding a torch for heating the metal.

9. The combination of a self-contained, portable and mechanically operated blow pipe apparatus for the purpose described, of a longitudinally extended guiding bed constituting the main frame or standard of the machine, electromagnets upon which the bed is mounted and constituting means for securing it to the surface of magnetizable metal to be cut, V-shaped guiding surfaces on said bed, a worm shaft fitted between the guiding surfaces, a torch carriage fitted to move along the bed and shaped to engage the guiding surfaces, means for disengageably connecting the torch carriage with the worm shaft whereby the carriage and shaft may be disconnected to permit the movement of the carriage from place to place on the bed, a pair of combined handles and roller supports pivoted to the extremities of the bed, a pair of springs fitted between the bed and the handles to maintain the handles depressed and the roller supports out of contact with the surface on which the apparatus rests, an electric motor attached to the guiding bed for driving the worm shaft, and means for regulating the speed of the electric motor also attached to the guiding bed.

10. In blow pipe apparatus for the purpose described, the combination of a heavy elongated machine bed having a carriage guideway, a torch carriage carried upon said guideway, driving gear for the carriage, and a plurality of massive supporting pedestals spaced lengthwise of the bed and shaped to afford a firm support for the apparatus on the surface of the metal to be cut, whereby the torch is accurately guided without vibration or displacement to make a smooth straight cut.

11. In blow pipe apparatus for the purpose described, the combination of a heavy elongated machine bed having a carriage guideway, a torch carriage carried upon said guideway in closely fitting sliding engagement therewith, driving gear for the carriage, and a plurality of massive supporting pedestals spaced lengthwise of the bed and shaped to afford a firm support for the apparatus on the surface of the metal to be cut, and means for magnetizing the pedestals to fix the apparatus immovably in place, whereby the torch is accurately guided without vibration or displacement to make a smooth straight cut.

12. In blow pipe apparatus for the purpose described, the combination of a heavy elongated machine bed having a carriage guideway, a torch carriage carried upon said guideway in closely fitting sliding engagement therewith, driving gear including an electric motor for the carriage, and a plurality of massive supporting pedestals spaced lengthwise of the bed and shaped to afford a firm support for the apparatus on the surface of the metal to be cut, means for magnetizing the pedestals to fix the apparatus immovably in place, and mechanism mounted on the bed for controlling the speed of the electric motor.

13. In blow pipe apparatus for the purpose described, the combination of a heavy elongated machine bed having a carriage guideway, a torch carriage carried upon said guideway in closely fitting sliding engagement therewith, driving gear for the carriage, a plurality of massive supporting pedestals spaced lengthwise of the bed and shaped to afford a firm support for the apparatus on the surface of the metal to be cut, and a pair of combined handles and roller supports pivoted to the machine so that when the handles are lifted the rollers will be brought into contact with the surface on which the machine rests.

14. In blow pipe apparatus for the purpose described, the combination of a heavy elongated machine bed having a carriage guideway, a torch carriage carried upon said guideway in closely fitting sliding engagement therewith, driving gear for the carriage, a plurality of massive supporting pedestals spaced lengthwise of the bed and shaped to afford a firm support for the apparatus on the surface of the metal to be cut, means for magnetizing the pedestals to fix the apparatus immovably in place, and a pair of combined handles and roller supports pivoted to the machine so that when the handles are lifted the rollers will be brought into contact with the surface on which the machine rests.

The above claims substantially described.

WILLIAM LEO HERRON.